United States Patent [19]

Nishio

[11] Patent Number: 5,453,973
[45] Date of Patent: Sep. 26, 1995

[54] DISC DRIVING DEVICE FOR STORAGE DISC

[75] Inventor: Akira Nishio, Fujieda, Japan

[73] Assignee: Victor Company of Japan, Ltd., Yokohama, Japan

[21] Appl. No.: 220,630

[22] Filed: Mar. 30, 1994

Related U.S. Application Data

[63] Continuation of Ser. No. 872,925, Apr. 23, 1992, abandoned.

[30] Foreign Application Priority Data

Apr. 26, 1991 [JP] Japan ................. 3-125386

[51] Int. Cl.⁶ ........................... G11B 25/04
[52] U.S. Cl. ........................... 369/266
[58] Field of Search ............ 310/67 R; 360/99.08; 369/266, 208

[56] References Cited

U.S. PATENT DOCUMENTS

| | | | |
|---|---|---|---|
| 3,867,658 | 2/1975 | Dochterman | 310/71 |
| 4,322,647 | 3/1982 | Neroda et al. | 310/71 |
| 4,602,178 | 7/1986 | Larsson | 310/71 |
| 4,602,423 | 7/1986 | Ulrich et al. | 310/40 R |
| 4,900,958 | 2/1990 | Kitahara et al. | 310/67 R |
| 4,965,476 | 10/1990 | Lin | 310/51 |
| 5,061,868 | 10/1991 | Iwazaki et al. | 310/67 R |
| 5,065,060 | 11/1991 | Takahashi et al. | 310/67 R |
| 5,093,595 | 3/1992 | Korbel | 310/67 R |
| 5,097,366 | 3/1992 | Ueki et al. | 360/97.02 |
| 5,128,819 | 7/1992 | Elsaesser et al. | 360/99.08 |
| 5,177,650 | 1/1993 | Jabbari et al. | 360/99.08 |

*Primary Examiner*—Robert S. Tupper
*Assistant Examiner*—George J. Letscher
*Attorney, Agent, or Firm*—Michael N. Meller

[57] ABSTRACT

The specification discloses a disc driving device having a spindle motor for driving a storage disc with a hub mounted on a spindle of the spindle motor in a sealed housing. The spindle motor comprises the spindle, a stator frame for supporting the spindle with bearings therebetween and a core assembly fitted over the stator frame. The core assembly comprises a laminated core subjected to an electroless metal plating, an insulator generally covering the laminated core, which insulator has projections for fixing a flexible board and retainers for holding winding coils on the laminated core. The sealed housing comprises a housing having a concave portion at the bottom thereof. The concave portion comprises a upper portion having a concave wall and a lower portion having a cylindrical wall coupled to the upper portion. The stator frame is fixed in the lower portion, and a part of the hub is positioned in the upper portion. Further, a trench is provided on the concave wall of the upper portion for holding the flexible board in place so as not to disturb the rotation of the hub in the sealed housing.

2 Claims, 4 Drawing Sheets

1

DISC DRIVING DEVICE FOR STORAGE DISC

This application is a continuation of U.S. application Ser. No. 872,925, filed Apr. 23, 1992, now abandoned.

BACKGROUND OF THE INVENTION

1. Field of the Invention

The present invention relates to improvements of a disc driving device for a disc storage(memory) system used for computers.

2. Description of the Related Art

Presently, in order to rotate a storage disc in a sealed housing of disc storage systems employing such as "Hard Disc" (referred to as "HD") or "Magneto-Optical Disc", a disc driving device is widely used in such a disc driving systems.

In the disc driving device for driving such as an HD comprised of a hard material substrate and a magnetic layer thereon, the HD is sealed together with a flying head within a housing for recording and reproducing signals on and from the HD.

FIG. 1 is a cross sectional view of main part of an example of a disc driving device using HDs in a prior art.

FIG. 2 is a cross sectional view of main part of another example of a disc driving device using HDs in a prior art.

Referring to FIG. 1, provided in a sealed housing 203 of a disc driving device 200, are a hub 206 on which a plurality of HDs 205 is coaxially mounted, and ring spacers 211 are interposed between the HDs 205, and other components such as flying heads (not shown).

The sealed housing 203 comprises a housing 202 having an upper opening covered with a top plate 201, and a lower opening. A spindle motor 208 rotating the hub 206 generally comprises an outer rotor 208a and a stator having a stator frame 210 (described hereafter) which covers the lower opening of the housing 202 so that the outer rotor 208a protrudes from the housing 202 through the lower opening. The hub 206 is coaxially mounted at the distal end of the spindle 207 which is rotatably supported from the stator frame 210 by bearings 204 provided at an inner wall of the stator frame 210. Further, the sealed housing 203 is sealed by a magnetic fluid seal 209 provided between the inner wall of stator frame 210 and the spindle 207 so as to prevent dust from invading the sealed housing 203 through the outer rotor 208a which is exposed to the external atmosphere. In the above mentioned disc driving device 200, the flying heads float from the rotating HDs 205 at a predetermined distance and perform recording and reproducing of signals on/from the rotating HDs 205 within the sealed housing 203. Referring to FIG. 2 illustrating another disc driving device 300, a hub 309 on which a plurality of HDs 304 is coaxially mounted, and ring spacers 310 are interposed between the HDs 304. Other components such as flying heads (not shown) and a spindle motor 305 are provided together with the hub 309, the HDs 304 and spacers 310, all within in a sealed housing 303. The sealed housing 303 comprises a housing 302 having an upper opening closed with a top plate 301, a lower opening closed with a stator frame 306 of the spindle motor 305, so that the stator frame 306 protrudes into the housing 302. A spindle 307 is supported from the stator frame 306 by bearings 311 provided at an inner wall thereof. The sealed housing 303 is sealed by a seal member 308 at an opening provided at a bottom of the stator frame 306 through which the bearings 311 are installed.

In the operation of the above mentioned disc driving device 300, the flying heads float from the rotating HDs 304 at a predetermined distance and perform recording and reproducing of signals on/from the rotating HD 304 within the sealed housing 303.

In the first example of the prior art device 200 shown in FIG. 1, there present problems that it needs the magnetic fluid seal 209 between the stator frame 210 and the spindle 207 to prevent dust from invading the sealed housing 203 so that it requires a rather complicated structure. Further, the large lower opening provided in the housing 202 for mounting the stator frame 210 decreases the mechanical strength of the housing 202.

In the second example of the prior art device 300 in shown FIG. 2, there also presents a problem that a motor core 305a which is exposed in the sealed housing 303, is liable to get rusty in an extended use becoming a source of dust. In order to eliminate this problem, the motor core 305a is normally coated with a layer of epoxy resin having a thickness from 50 to 60 µm, this increases a gap Between the motor core 305a and a rotor magnet 305b causing the efficiency of the spindle motor to degrade.

SUMMARY OF THE INVENTION

Accordingly, a general object of the present invention is to provide a disc driving device in which the above disadvantages have been eliminated.

A more specific object of the present invention is to provide a disc driving device which is small, reliable and efficient for its assembly.

Another and more specific object of the present invention is to provide a disc driving device having a spindle motor for driving a storage disc with a hub mounted on the spindle of the spindle motor in a sealed housing. The spindle motor comprises the spindle, a stator frame for supporting the spindle with bearings provided therebetween and a core assembly fitted over the stator frame. The core assembly comprises a laminated core plated with electroless metal plating, an insulation member covering generally the laminated core, which insulation member has projections for attaching a flexible board and retainers for holding winding coils. The sealed housing comprises a housing provided with a concave portion at a bottom and an opening at a top thereof which is covered with a top plate. The concave portion comprises an upper portion having a concave wall and a lower portion having an enclosing wall coupled to the upper portion. The stator frame is fixed in the lower portion, and a part of the hub is positioned in the upper portion. Further, the concave wall is bulged partly outward to provide a trench on the concave wall for holding a flexible board in place, which flexible board is for supplying a power to the spindle motor. And the flexible board is fixed to and kept within the trench so as not to disturb rotation of the hub.

Other objects and further features of the present invention will be apparent from the following detailed description when read in conjunction with the accompanying drawings.

BRIEF DESCRIPTION OF THE DRAWINGS

Preferred examples of the present invention will be described with reference to the accompanying drawings wherein.

DETAILED DESCRIPTION OF THE PREFERRED EMBODIMENT

Figure 3:
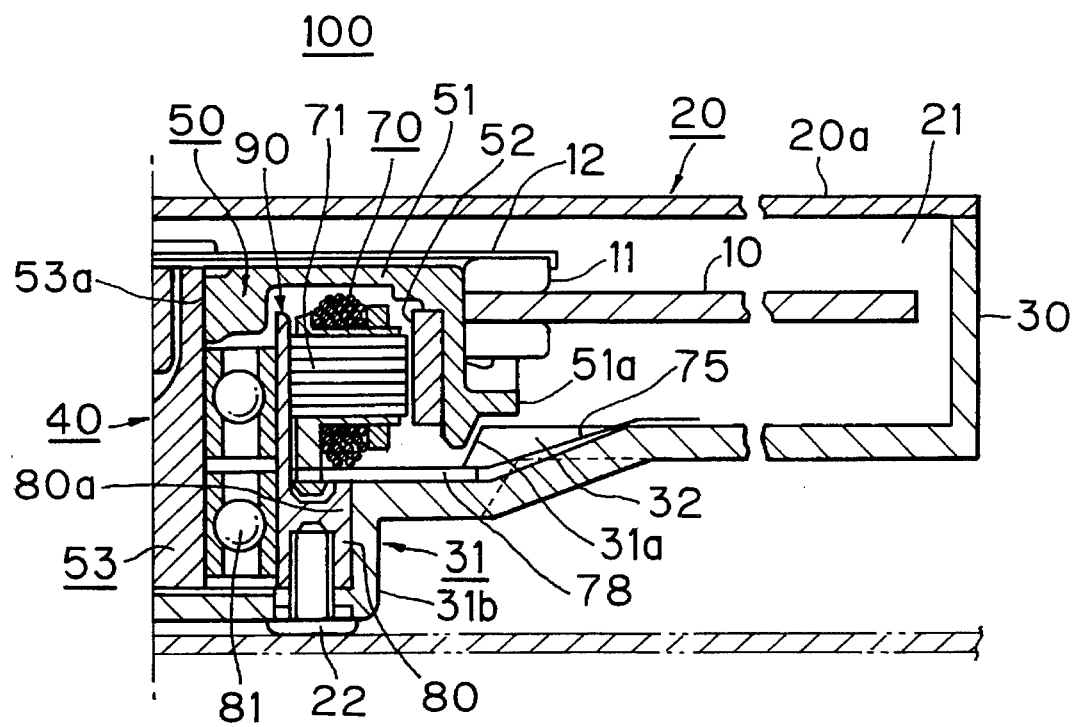
FIG. 3 is an elevation and semi cross-sectional view showing a main part of a disc driving device according to the present invention.

FIG. 3 is an elevation and semi half vertical cross-sectional view showing a main part of a disc driving device according to the present invention.

Referring to FIG. 3, the disc driving device 100 comprises generally a sealed housing 20, a spindle motor 40 for rotating at least one storage disc (H) 10 together with a hub 51, and flying heads (not shown). The sealed housing 20 comprises a housing 30 provided with a generally concave portion 31 at a bottom of the housing 30 and with an upper opening at a ceiling of the housing 30, and a top plate 20a closing the upper opening. The concave portion 31 comprises an upper portion 31a having a concave wall coupled to the bottom of the housing 30, and a lower portion 31b having a cylindrical wall coupled to the upper portion 31a. A base 80a of a stator frame 80 which is one of main components of the spindle motor 40, is snug fitted in the lower portion 31b at the cylindrical wall and fixed with screws 22 at the bottom thereof. Further, the concave wall is bulged partly outward to provide a trench 32 on an inside for holding a flexible board 75 in place shown in FIG. 6, which is connected to the spindle motor 40 for supplying a power thereto. The flexible board 75 is thus laid out along the bottom surface of the sealed housing 20 without disturbing the rotation of the spindle motor 40.

In the assembly process of the disc driving device 100, the device 100 is assembled in a clean room so as to prevent dust from invading the sealed housing 20. After the assembly process has finished, the sealed housing 20 is kept dust free by introducing an air flow into the sealed housing 20 from the atmosphere through a filter device (not shown).

In the above mentioned disc driving device 100, the flying heads float from the rotating HD 10 mounted on the hub 51 at a predetermined distance and perform recording and reproducing of signals on/from the rotating HD 10 within the sealed housing 20.

Figure 1:
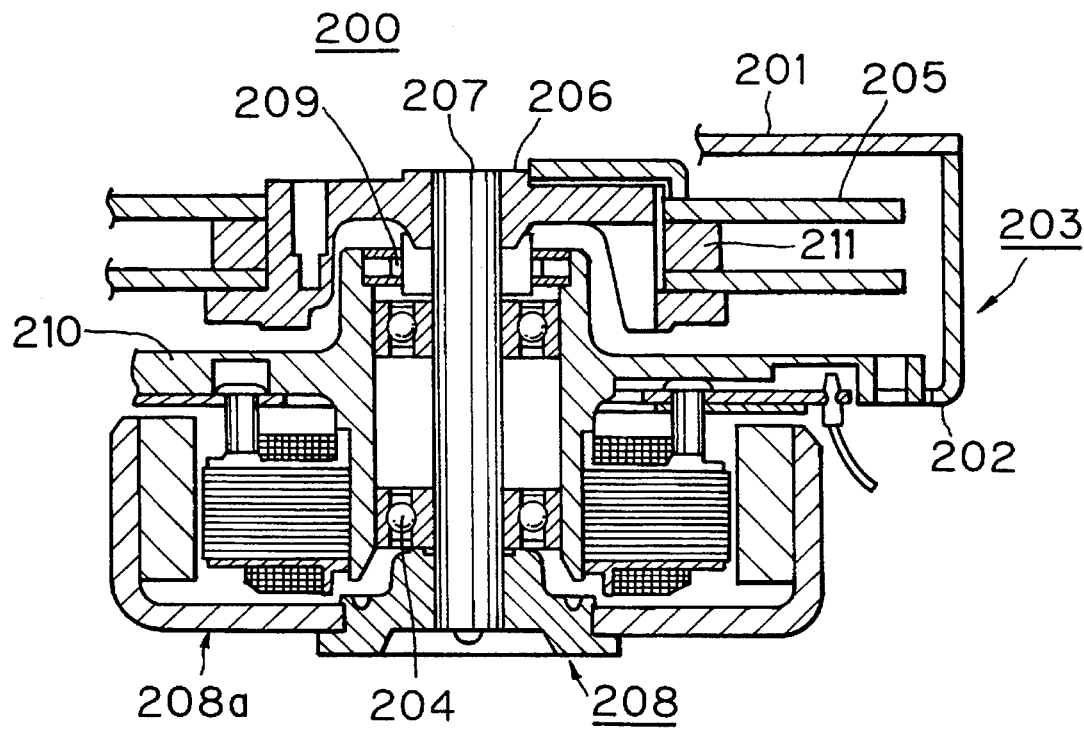
FIG. 1 is a cross-sectional view of main part of an example of a disc driving device for a storage disc in a prior art.
Figure 2:
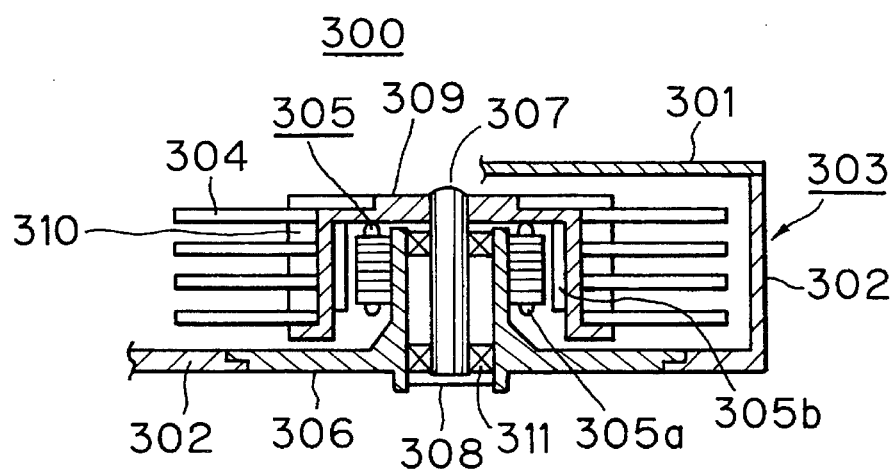
FIG. 2 is a cross-sectional view of main part of another example of a disc driving device for a storage disc in a prior art.

In the recording and reproducing process, the presence of the dust between the HD 10 and the flying head is liable to cause the breakage of the HD and/or the flying head, but the device 100 according to the present invention is able to prevent dust from invading the sealed housing 20 through the bearings without providing the magnetic fluid seal, which is seen in the prior art shown in FIG. 1, by accommodating the whole spindle motor 40 in the sealed housing 20. Further, the device 100 securely maintains mechanical strength because it does not have a large opening for installing the spindle motor 40 to the housing 30, which is seen in the prior art shown in FIG. 1 and FIG. 2. Furthermore, the spindle motor 40 has a dust free configuration.

Next, description will be given to the spindle motor 40.

Referring to FIG. 3, the spindle motor 40 comprises generally a rotor assembly 50 and a stator assembly 90. The rotor assembly 50 comprises a hub 51 and a spindle 53. The hub 51 has an open end cylinder configuration, and is provided with a center hole at a center of the cylinder, a flange 51a at an outer skirt of the cylinder and magnets 52 on the inner wall of the cylinder. The center hole of the hub 51 is press fitted over a step-like shaft 53a formed at the distal end of the spindle 53 to rotatably support the hub 51 by the spindle 53. Further, the HD 10 is coaxially mounted and fixed on the hub 51 in such a manner as being interposed between a pair of ring spacers 11, one of which is engaged with the flange 51a and the other is depressed by a clamper 12 made of an elastic member. Flatness of both the contacting surfaces of the spacer 11 and the HD 10 is kept below 2 μm so that a runout of the surface of the HD is maintained within an acceptable level.

The other hand, the stator assembly 90 comprises the stator frame 80 and a core assembly 70. The spindle 53 mounting the hub 51 is rotatably supported from the stator assembly 90 by installed between the spindle 53 and an inner wall of the stator frame 80 which is snug fitted to the lower portion 31b of the concave portion 31. The core assembly 70 having a laminated core 71 (as will be described hereafter) is fitted around a periphery of the stator frame 80 in such a manner that an outer periphery of the laminated core 71 faces the magnet 52 provided along the inner wall of the cylindrical hub 51 at a predetermined clearance.

Figure 4A:
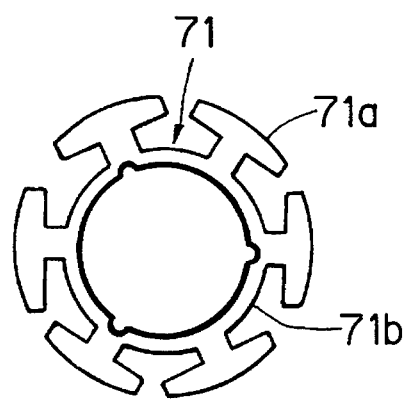
FIG. 4A is a plan view showing a laminated core.
Figure 4B:
FIG. 4B is an elevation view of FIG. 4A.
Figure 5A:
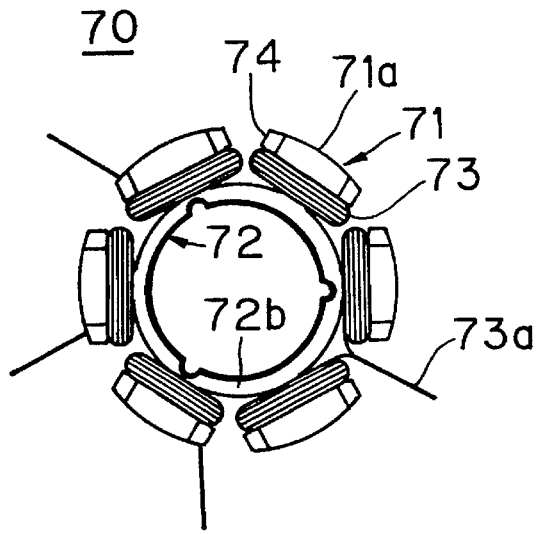
FIG. 5A is a plan view showing a core assembly.
Figure 5B:
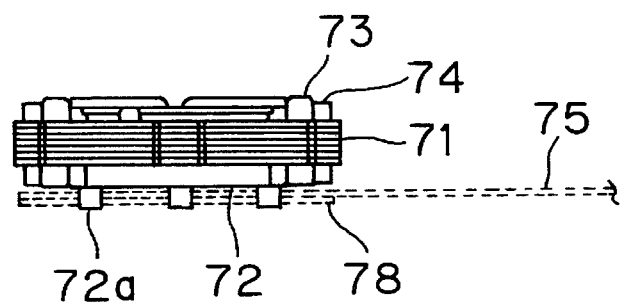
FIG. 5B is an elevation view of FIG. 5A.
Figure 5C:
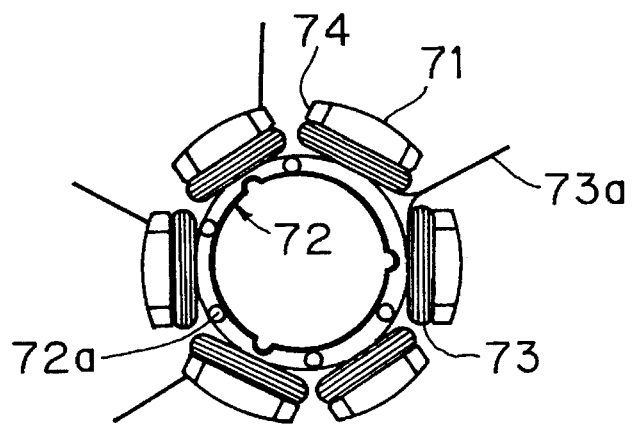
FIG. 5C is a bottom view of FIG. 4A.

FIG. 4A is a plan view showing the laminated core 71 and FIG. 4B is an elevation view of FIG. 4A. FIG. 5A is a plan view showing the core assembly, FIG. 5B is an elevation view of FIG. 5A and FIG. 5C is a bottom view of FIG. 5b.

Referring to these Figures, the core assembly 70 is generally comprised of a laminated core 71, an insulation member 72 plastic-molded integrally with the laminated core 71 covering generally thereof, and coils 73 wound on the laminated core 71 generally covered by the insulation member 72. As shown in FIG. 4A and 4B, the laminated core 71 is configured by laminating a plurality of ring cores each of which has T-shaped protruding parts 71a at a regular intervals around an outer periphery of the ring core 71b.

The laminated core 71 is coated with a layer of Ni material by an electroless Ni-plating process as a rust-proof treatment. In the process, the laminated core 71 is subjected to a solution-substitution cleaning to remove residues of electrolyte between the cores, and is dried by hot air. Therefore, the laminated core 71 does not get rusty thus not become a source of dust in the sealed housing 20.

Further, the Ni layer formed by the electroless Ni plating is easily controlled to be uniform thickness, so that the clearance between the magnets 52 and the laminated core 71 can be made minimum, which makes the spindle motor quite efficient. The insulation member 72 comprises a layer of resin generally covering the laminated core 71 except for an inner surface thereof which interfaces the bearings 81, and an outer periphery thereof which oppose the magnets 52 of the rotor assembly 50, and further comprises retainers 74 for holding the coils 73 in place and projections 72a in a circular configuration at a bottom of the laminated core 71. Both of the retainers 74 and the projections 72a are molded as integral parts of the insulation member 72 together with the laminated core 71. A pair of the retainers 74 projects upward and downward respectively from a top and a bottom of each T-shaped portion of the laminated core 71 at both ends of the top bar of the "T". Wire ends 73a are connected to the flexible board 75 which is attached to the projections 72a thus is held under the bottom of the laminated core 71, so that the coils 73 are connected to an outside circuitry not shown.

Figure 6:
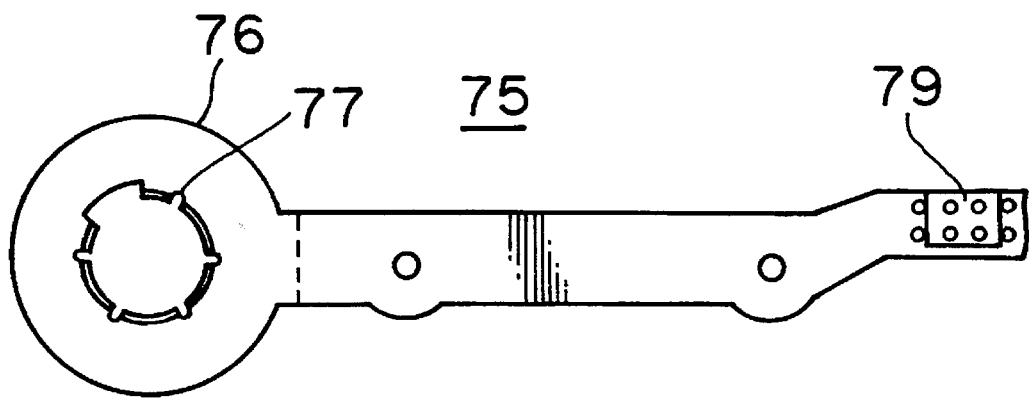
FIG. 6 is a plan view showing a flexible board.

FIG. 6 is a plan view showing a flexible board 75.

Referring to FIG. 6, the flexible board 75 is provided with a ring attachment 76 for being fixed to the insulation member 72 at one distal end, and a connector 79 for connecting outer electric circuits at another distal end thereof. Further, cut-outs 77 are provided along the inner rim of the ring attachment 76 at positions corresponding to the projections 72a.

For assembling the flexible board 75 with the core assembly 70, the projections 72a of the insulation member 72 are fitted in the cut-outs 77 and calked at the distal ends thereof, and wire ends 73a of coils 73 are soldered to conductors (not shown) printed on the flexible board 75. Then, a reinforcement plate 78 is laminated to the whole bottom of the ring attachment 76 to secure the mounting of the flexible board 75 on the insulation member 72.

Figure 7:
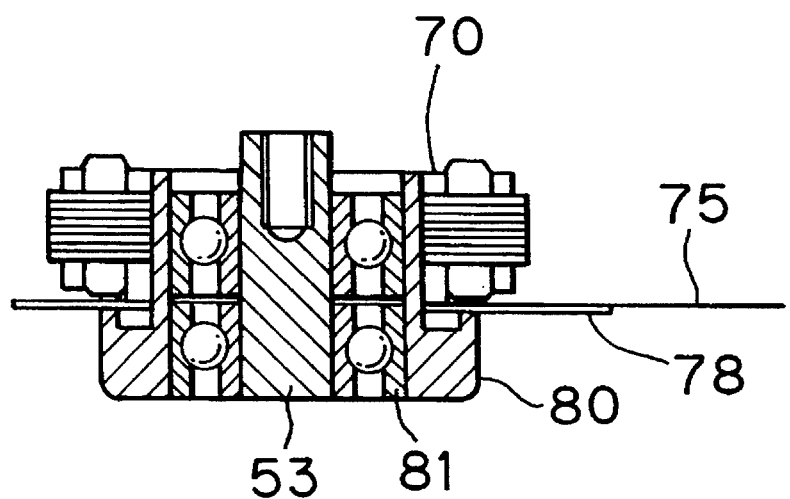
FIG. 7 is a sectional view showing a whole of the core assembly, a stator frame, the flexible board and a spindle.

FIG. 7 is a sectional view showing a whole of the core assembly, the stator frame, the flexible board and the spindle.

As previously mentioned, in the spindle motor 40 according to the present invention, the core assembly 70 is fitted over the periphery of the stator frame 80, and the flexible board 75 is mounted under the core assembly 70. Further, the spindle 53 is rotatably supported from the stator assembly 90 by bearings 81 located between the spindle 53 and the inner wall of the stator frame 80 and the hub 51 is press-fitted to the end of the spindle 53.

In the above mentioned spindle motor 40, the assembly process is so simple thus efficient, and the laminated core 71 subjected to the rust-proof treatment, does not scatter dust in the sealed housing.

According to the construction of the present invention, the disc driving device 100 can prevent dust from invading the sealed housing 20 through the bearings without providing the magnetic fluid seal, which is seen in the prior art shown in FIG. 1, by accommodating the whole spindle motor 40 in the sealed housing 20. Further, the device can maintain mechanical strength because it does not have a large opening for installing the spindle motor on the housing 30, which is seen in the prior art shown in FIG. 1 and FIG. 2. Further, the trench 32 is provided on the circular cone wall of the upper portion 31a for embedding the flexible board 75, so that the flexible board 75 does not disturb rotation of the hub in the sealed housing.

Furthermore, the laminated core 71 is plated with the Ni layer by the electroless metal plating process, so that it does not get rusty and does not become a source of dust in the sealed housing 20. Further, the Ni layer formed by the electroless Ni plating can easily be controlled to be uniform thickness, so that the clearance between the magnets 52 and the laminated core 71 can be made minimum, which makes the spindle motor efficient in power.

For assembling the flexible board 75 with the core assembly 70, the projections 72a provided on the insulation member 72 are fitted in the cut-outs 77 of the flexible board 75 and calked at the distal ends thereof so that the assembly process is simple.

What is claimed is:

1. A disc driving device having a spindle motor for driving a storage disc with a hub mounted on a rotatable spindle of said spindle motor, said disc driving device comprising:

a magnet provided on an inner surface of said hub;

a stator frame for rotatably supporting the rotatable spindle of said spindle motor through bearing means; and a core assembly fitted over the stator frame, wherein said core assembly comprises a laminated core having an outer periphery which faces said magnet at a predetermined clearance and has an outer coating formed by the process of forming, a Ni metal layer by electroless Ni-plating to produce a thin uniform coating thickness of nickel so as to minimize said predetermined clearance between said magnet and said laminated core, applying an insulation member plastic-molded integrally on said Ni metal layer and winding a coil on the insulation member.

2. A disc driving device having a spindle motor for driving a storage disc with a hub mounted on a rotatable spindle of said spindle motor, said disc driving device comprising:

a sealed housing comprising a housing having an upper opening and a generally concave portion at a bottom thereof and comprising a top plate, said upper opening covered with said top plate so as to make a hermetically sealed chamber in said housing, said generally concave portion comprising an upper portion having an enclosed concave wall and a lower portion having an elongated cylindrical recess which is provided within said enclosed concave wall such that said elongated cylindrical recess has a closed bottom at a distal end thereof and has a smaller diameter than that of said upper portion and extends below said enclosed concave wall; and a stator frame for supporting a stator core therearound, said stator frame defining a hole for rotatably supporting said rotatable spindle of said spindle motor through bearing means therein and having a mounting base for mounting said stator frame in said housing, wherein said stator frame together with said rotatable spindle and said bearing means is mounted in said housing by causing said mounting base thereof to be tightly fitted in said elongated cylindrical recess and to be fixed on said closed bottom thereof with screw means, and causing a part of said hub mounted on said rotatable spindle to be positioned within said enclosed concave wall such that said spindle motor is fully enclosed with said housing and said top plate, wherein said disk driving device further comprises:

a magnet provided on an inner surface of said hub; and a core assembly fitted over the stator frame, wherein said core assembly comprises a laminated core having an outer periphery which faces said magnet at a predetermined clearance, an Ni metal layer coated on said laminated core by an electroless Ni-plated process to form a nickel coating of uniform thickness so as to minimize said predetermined clearance between said magnet and said laminated core, an insulation member plastic-molded integrally on said Ni metal layer coated on said laminated core covering generally the laminated core covered with said Ni metal layer, and a coil wound on the insulation member.

* * * * *